(12) United States Patent
Khafagy et al.

(10) Patent No.: US 10,570,871 B2
(45) Date of Patent: Feb. 25, 2020

(54) METHODS AND SYSTEM FOR STARTING AN ENGINE

(71) Applicant: Ford Global Technologies, LLC, Dearborn, MI (US)

(72) Inventors: Hafiz Khafagy, Dearborn, MI (US); Siraj Siddiqui, Lasalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/001,216

(22) Filed: Jun. 6, 2018

(65) Prior Publication Data

US 2019/0376483 A1 Dec. 12, 2019

(51) Int. Cl.
| | | |
|---|---|---|
| *F02N 15/02* | (2006.01) | |
| *F02N 11/00* | (2006.01) | |
| *F02N 11/08* | (2006.01) | |
| *F02N 11/04* | (2006.01) | |

(52) U.S. Cl.
CPC ............ *F02N 15/022* (2013.01); *F02N 11/04* (2013.01); *F02N 11/0851* (2013.01); *F02N 2300/102* (2013.01); *Y10S 903/903* (2013.01)

(58) Field of Classification Search
CPC .... B60K 6/485; B60K 6/24; B60K 2006/268; F02N 11/00; F02N 15/022
See application file for complete search history.

(56) References Cited

U.S. PATENT DOCUMENTS

| | | | | |
|---|---|---|---|---|
| 6,484,596 | B2* | 11/2002 | Puchas | F02N 11/04 123/179.28 |
| 6,648,783 | B1* | 11/2003 | Bogner | F16H 7/1281 474/134 |
| 6,838,805 | B2* | 1/2005 | Oohashi | H02K 7/1004 310/261.1 |
| 7,996,135 | B2* | 8/2011 | Ishii | F02N 11/0855 123/179.3 |
| 2001/0003923 | A1* | 6/2001 | Puchas | F02N 11/04 74/6 |
| 2002/0117860 | A1* | 8/2002 | Man | B60K 6/365 290/46 |
| 2003/0033929 | A1 | 2/2003 | Pinnau et al. | |
| 2003/0048035 | A1* | 3/2003 | Oohashi | H02K 7/1004 310/263 |
| 2016/0258409 | A1* | 9/2016 | Marthaler | F02N 11/003 |

FOREIGN PATENT DOCUMENTS

WO 03033929 A1 4/2003

* cited by examiner

*Primary Examiner* — Long T Tran
(74) *Attorney, Agent, or Firm* — David Kelley; McCoy Russell LLP (57) ABSTRACT

Systems and methods for operating a hybrid powertrain or driveline that includes an engine and an integrated starter/generator are described. In one example, the integrated starter/generator may crank the engine via a pinion gear during a first engine start. The integrated starter/generator may crank the engine via a belt during a second engine start.

6 Claims, 7 Drawing Sheets

METHODS AND SYSTEM FOR STARTING AN ENGINE

FIELD

The present description relates to methods and a system for operating a powertrain of a hybrid vehicle. The methods and systems may be particularly useful for hybrid vehicles that include a belt driven integrated starter/generator.

BACKGROUND AND SUMMARY

A hybrid powertrain or driveline may include a belt integrated starter/generator (BISG) to charge a battery of a vehicle, provide propulsion power to the vehicle, and to start an engine of the vehicle. The BISG may be mechanically coupled to an engine crankshaft or camshaft via a belt. A tensioning device may be applied to the belt to keep the belt snugly placed against a crankshaft pulley and a pulley that is coupled to a BISG shaft or a shaft that is coupled to the BISG. However, the pulley may not be effective to transfer torque between the BISG and the engine during some conditions and the belt may slip. The belt may degrade when belt slip is present and energy transfer between the BISG and the engine may be reduced. Therefore, it may be desirable to provide a way of reducing the possibility of belt degradation and maintaining energy transfer between the BISG and the engine during conditions where the possibility of belt slip may increase.

The inventors herein have recognized the above-mentioned issues and have developed a powertrain operating method, comprising: cranking an engine via an integrated starter/generator, a pinion gear, and a flywheel during a first engine start; and cranking the engine via the integrated starter/generator, a belt, and a crankshaft pulley during a second engine start.

By engaging a pinion gear that is coupled to a BISG to an engine flywheel during engine starting, it may be possible to provide the technical result of reducing belt degradation and ensuring energy transfer between a BISG and an engine. In particular, a pinion gear that is coupled to a shaft of the BISG may engage a flywheel that is coupled to the engine so that a gear connection is provided between the BISG and the engine during conditions in which large amounts of energy may be exchanged between the BISG and the engine. The gear connection may reduce the possibility of belt slippage by increasing rigidity between the BISG and the engine. During conditions where energy transfer between the BISG and the engine is at lower levels, the pinion gear may be disengaged from the flywheel to reduce engine noise and vibration. A belt connection between the BISG and the engine may allow efficient torque transfer at reduced noise and vibration levels during conditions where energy transfer between the BISG and the engine is lower.

The present description may provide several advantages. In particular, the approach may allow a BISG to transfer large amounts of energy to an engine without belt degradation. Further, the approach may keep engine noise levels low during conditions when transfer of large amounts of energy between the BISG and the engine is not desired. Further still, the approach may reduce engine starting time when an engine is being cold started.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where:

FIGS. 3A-3I are drawn approximately to scale.

DETAILED DESCRIPTION

Figure 4:
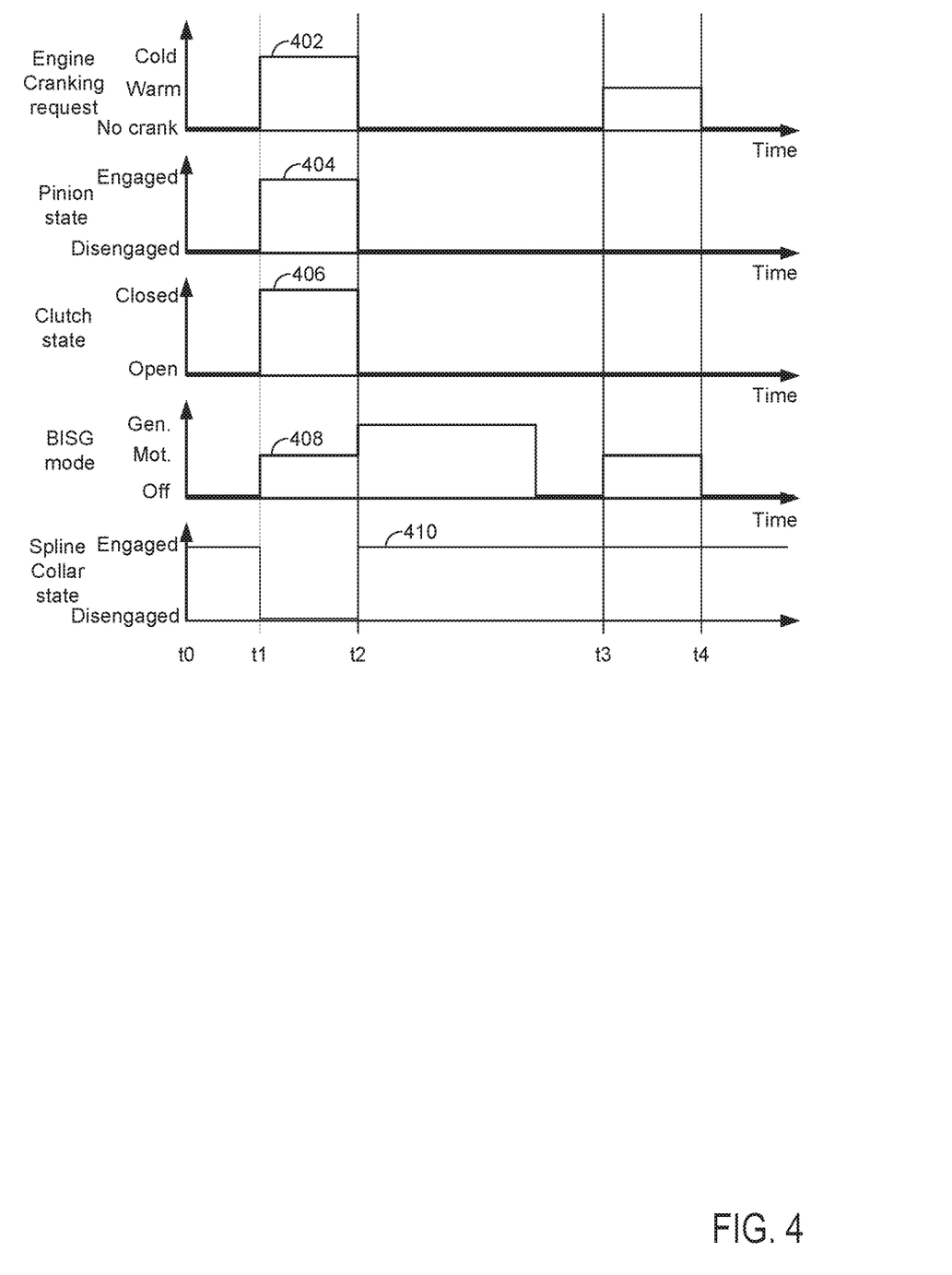
FIG. 4 shows an example BISG operating sequence.
Figure 5:
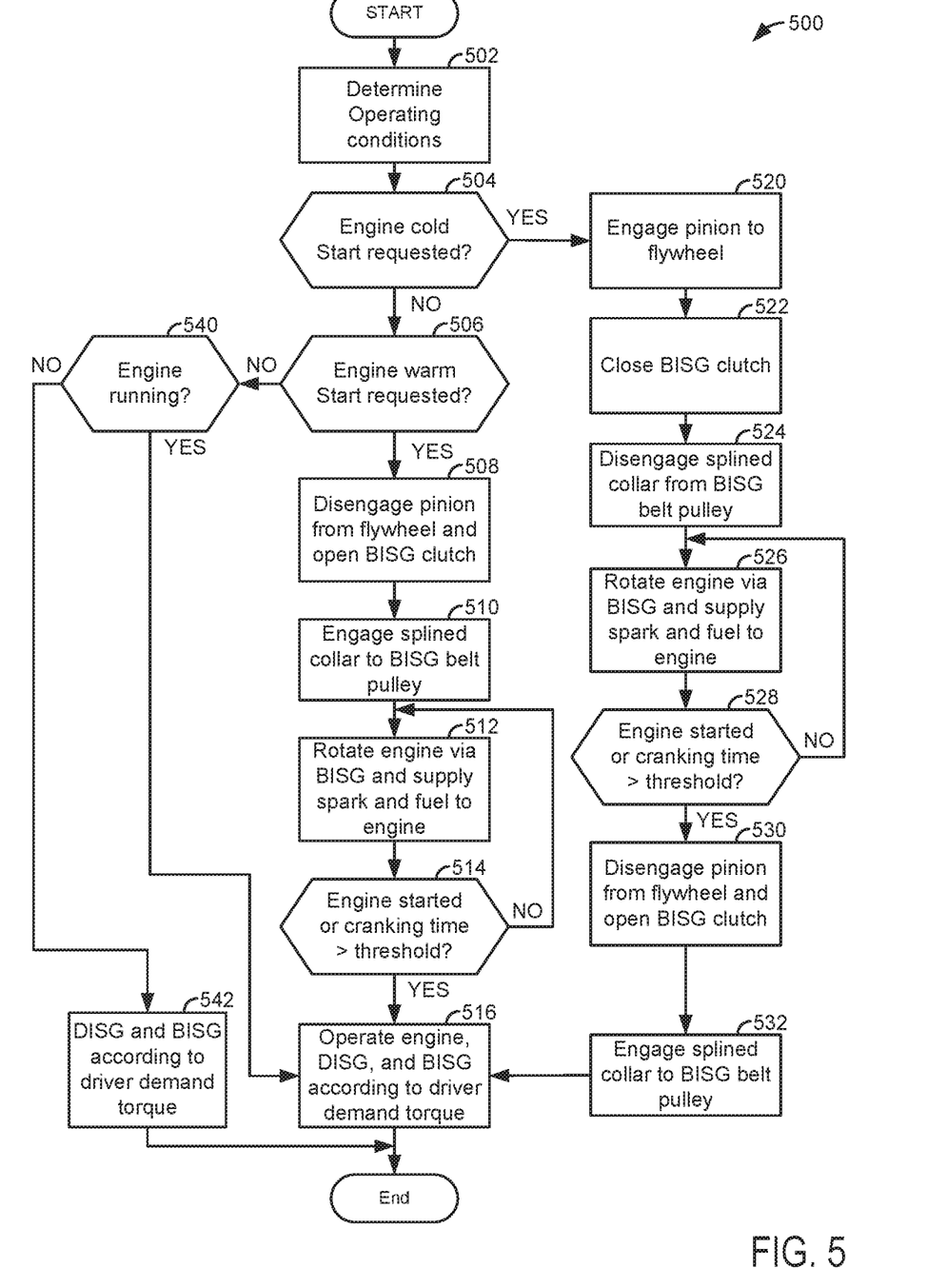
FIG. 5 describes a method for operating an engine that includes a BISG.

The present description is related to operating an engine and a BISG that may be used to start the engine when the engine is cold or warm. The engine may be of the type shown in FIG. 1. The engine and the BISG may be included in a driveline of a hybrid vehicle as is shown in FIG. 2. The BISG may be operated to crank the engine, generate electrical energy, or supply torque to propel a vehicle. FIGS. 3A-3I show several different configurations whereby a BISG may rotate and crank an engine during engine starting. In one example, the BISG is coupled to the engine via a belt during engine starting. In another example, the BISG is coupled to the engine via a pinion gear. An example operating sequence for starting an engine via a BISG clutch is shown in FIG. 4. A method for operating a BISG to improve engine starting is shown in FIG. 5.

Figure 1:
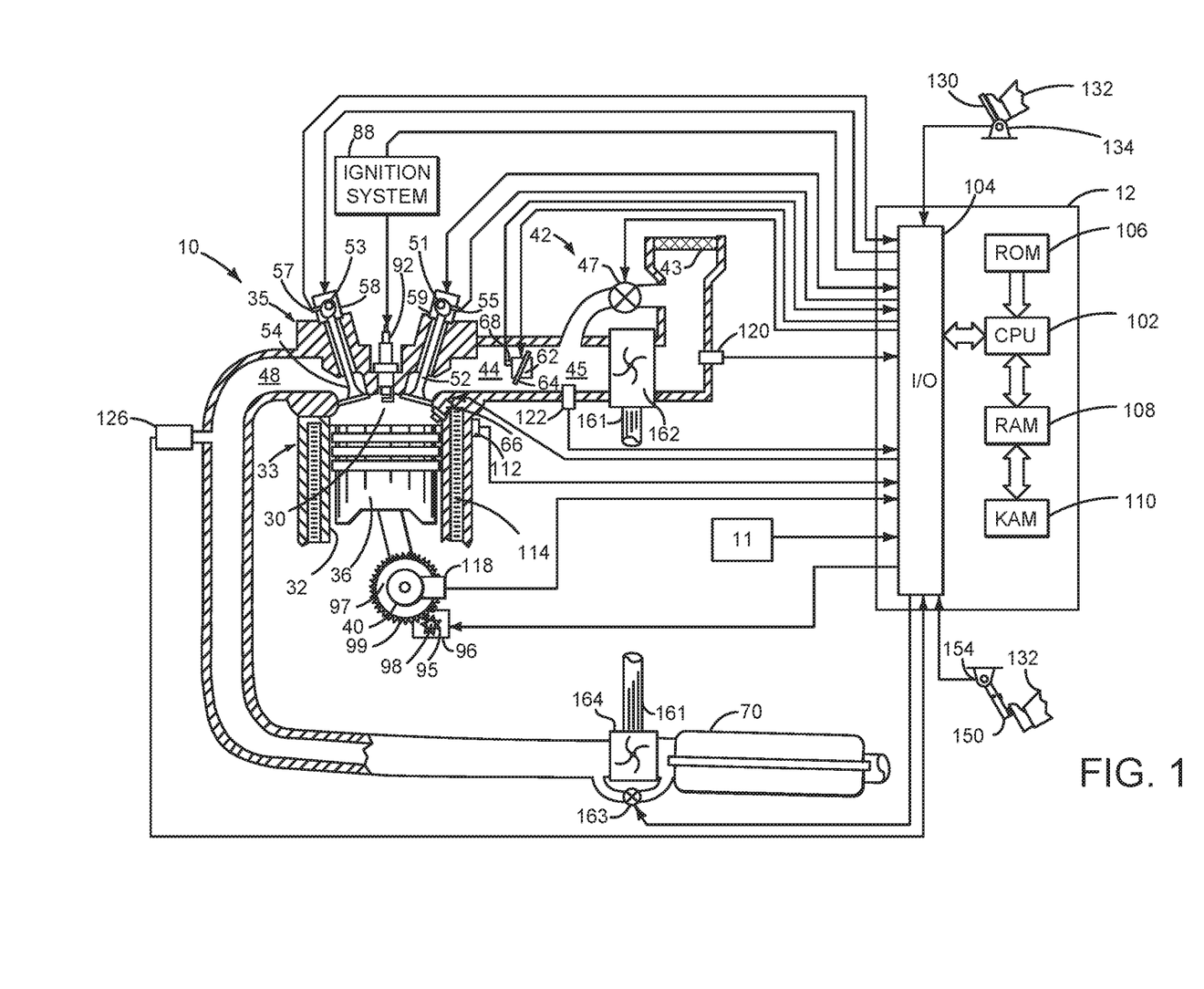
FIG. 1 is a schematic diagram of an engine.
Figure 2:
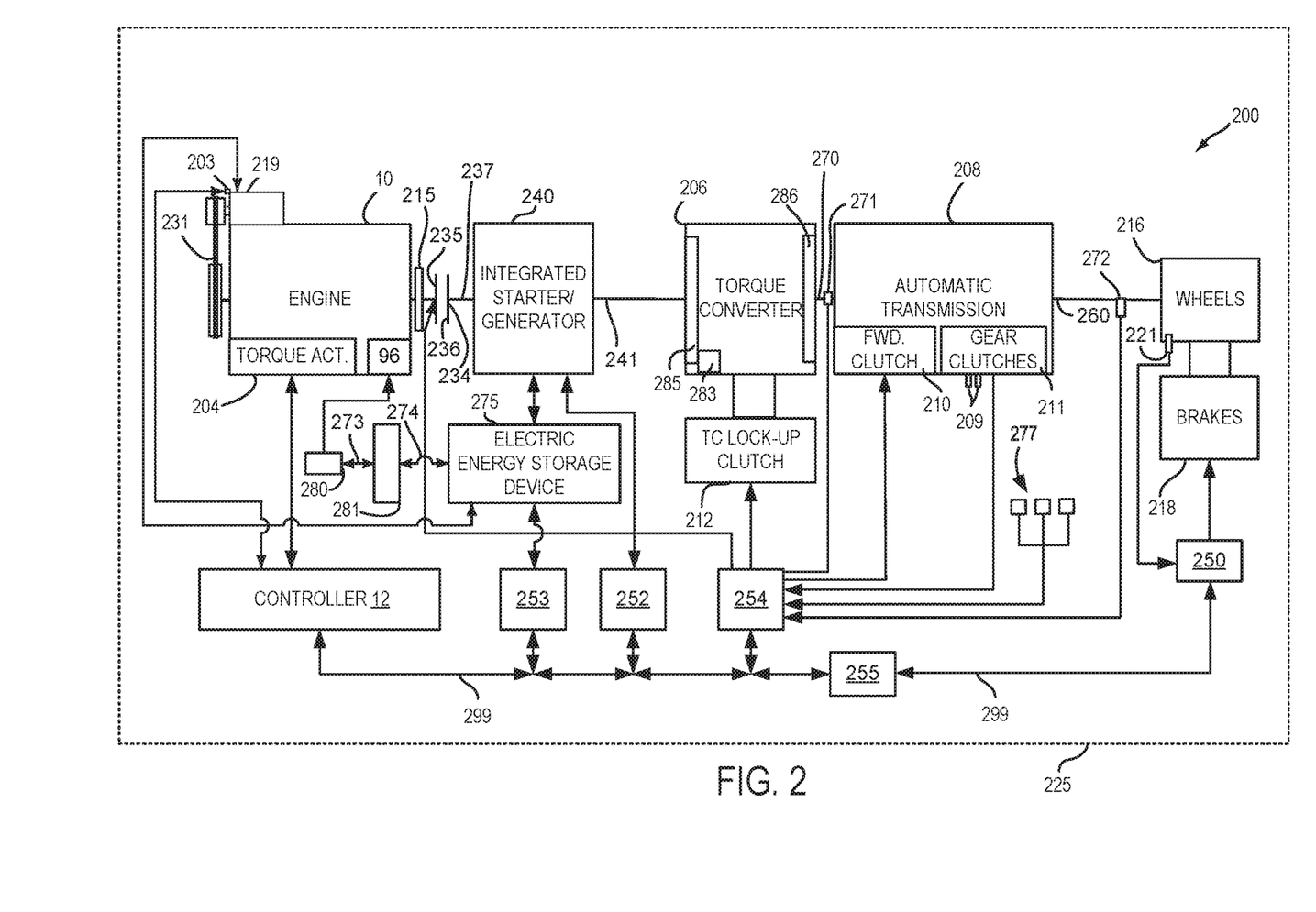
FIG. 2 is a schematic diagram of a hybrid vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3I and employs the actuators shown in FIGS. 1-3I to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Wastegate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a first braking torque from electric machine controller 252 and a second braking torque from brake controller 250, the first and second torques providing the desired braking torque at vehicle wheels 216.

In other examples, the partitioning of powertrain controlling devices may be different than that shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. In some examples, BISG 219 may be simply referred to as an ISG. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG 219 may be mechanically coupled to engine 10 via belt 231 or other means shown in FIGS. 3A-3I. BISG 219 may be coupled to crankshaft 40 or a camshaft (e.g., 51 or 53 of FIG. 1). BISG 219 may operate as a motor when supplied with electrical power via electric energy storage device 275 or low voltage battery 280. BISG 219 may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including accounting for transmission gearing.

Figure 3A:
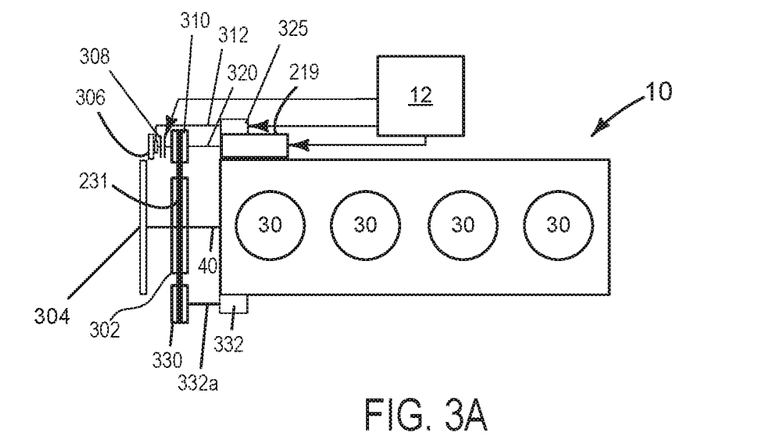
FIGS. 3A-3I show example BISG configurations.

Referring now to FIG. 3A, a sketch of a first example engine and BISG configuration is shown. In this example, engine 10 is shown with four cylinders 30 that provide torque to rotate crankshaft 40. A flywheel 304 and a crankshaft pulley 302 are directly coupled to crankshaft 40 and they rotate when crankshaft 40 rotates. Crankshaft pulley 302 is positioned between flywheel 304 and engine 10 along crankshaft 40. BISG 219 and accessories (e.g., power steering pump, air conditioning compressor, heat pump, air pump, etc.) 332 are coupled to crankshaft 40 via crankshaft pulley 302 and belt 231. Accessory pulley 330 is directly coupled to shaft 332a of accessory 332 and it transfers energy (e.g., torque) from belt 231 to accessories 332. BISG shaft 320 is directly coupled to BISG pulley 310 and BISG clutch 308. Pinion gear 306 is directly coupled to BISG clutch 308 as shown in greater detail in FIG. 3B. Alternatively, pinion gear 306 is directly coupled to BISG shaft 320 as shown in FIG. 3C. Solenoid 325 may be selectively actuated to cause pinion gear 306 to engage flywheel 304 via actuating arm 312. Controller 12 or an alternative controller commands solenoid 325 and BISG 219. Numerical labels that are common and used in FIGS. 3A-3I refer to the same devices, and the devices operate the same unless otherwise noted.

Figure 3B:
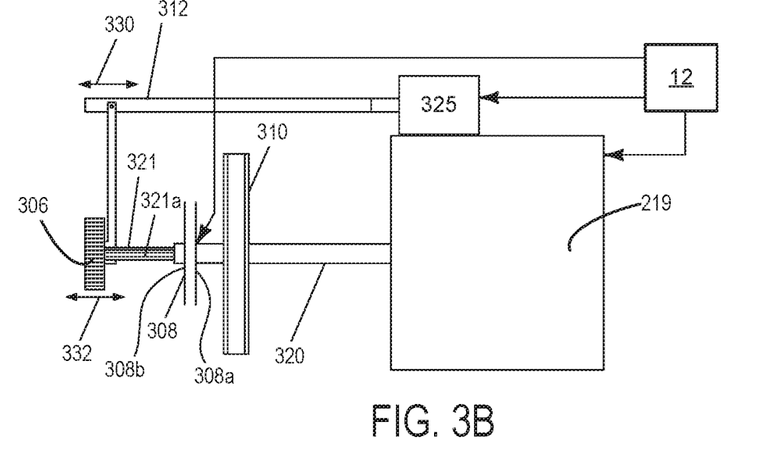
Figure 3C:
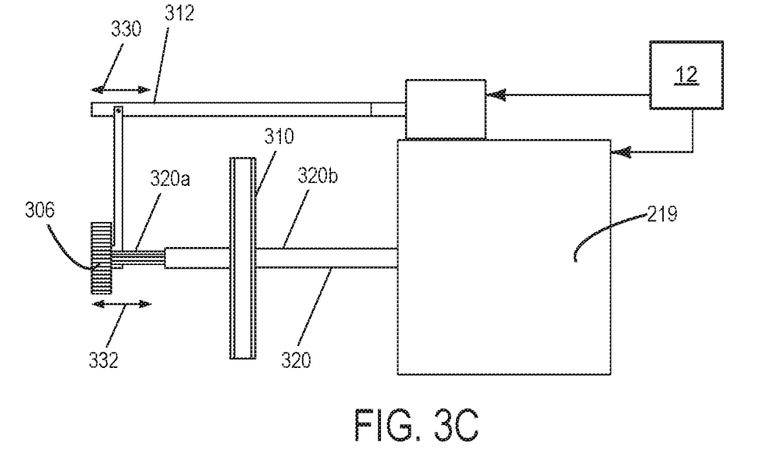

Referring now to FIG. 3B, a detailed view of a first example of the BISG configuration of FIG. 3A is shown. In this example configuration, BISG 219 includes a shaft 320 to which BISG pulley 310 is fastened so that BISG pulley 310 rotates with shaft 320. Shaft 320 is also directly coupled to a first side 308a of BISG clutch 308. A second side 308b of BISG clutch 308 is fastened to splined shaft 321 (e.g., a shaft including a series of narrow keys (splines 321a) formed longitudinally around a circumference of shaft 321 that fit into corresponding grooves of internal splines 371 (shown in FIG. 3I) in the pinion gear 306 that prevent axial movement between the pinion gear and the shaft 321). Splined shaft 321 may be supported via brackets and bearings (not shown). Pinion gear 306 is coupled to splined shaft 321 and pinion gear 306 may move along splined shaft 321 in a longitudinal direction as indicated by arrow 332. Solenoid 325 may extend actuating arm 312 longitudinally in the direction of arrow 330 when activated to engage pinion gear 306 to flywheel 304 (shown in FIG. 3A). Solenoid 325 may retract actuating arm 312 when deactivated (e.g., spring return or electrical return (not shown)) to disengage pinion gear 306 from flywheel 304 (shown in FIG. 3A). BISG clutch 308 may be electrically or hydraulically actuated. BISG 219 may transfer torque to and rotate engine 10 via flywheel 304 when BISG clutch is fully closed and when pinion gear 306 is engaging flywheel 304. Opening BISG clutch 308 allows pinion gear 306 to cease rotating when pinion gear 306 is disengaged from flywheel 304 so that engine noise and vibration may be reduced. Controller 12 or another controller may adjust a position of solenoid 325 and operating state of BISG 219.

Referring now to FIG. 3C, a detailed view of a second example of the BISG configuration of FIG. 3A is shown. In this example configuration, BISG 219 includes a shaft 320 to which BISG pulley 310 and pinion gear 306 are coupled so that BISG pulley 310 rotates with shaft 320. In this example, clutch 308 is removed, which may reduce cost in systems where noise and vibration of rotating pinion gear 306 at the speed of BISG 219 is not of concern. Shaft 320 includes a smooth non-splined section 320b and a splined section 320a. Pinion gear 306 is coupled to splined section 320a and pinion gear 306 may move along splined section 320a in an longitudinal direction as indicated by arrow 332. Solenoid 325 may extend actuating arm 312 longitudinally in the direction of arrow 330 when activated to engage pinion gear 306 to flywheel 304 (shown in FIG. 3A). Solenoid 325 may retract actuating arm 312 when deactivated (e.g., spring return or electrical return (not shown)) to disengage pinion gear 306 from flywheel 304 (shown in FIG. 3A). BISG 219 may transfer torque to and rotate engine 10 via flywheel 304 when pinion gear 306 is engaging flywheel 304. Controller 12 or another controller may adjust a position of solenoid 12 and operating state of BISG 219.

Figure 3D:
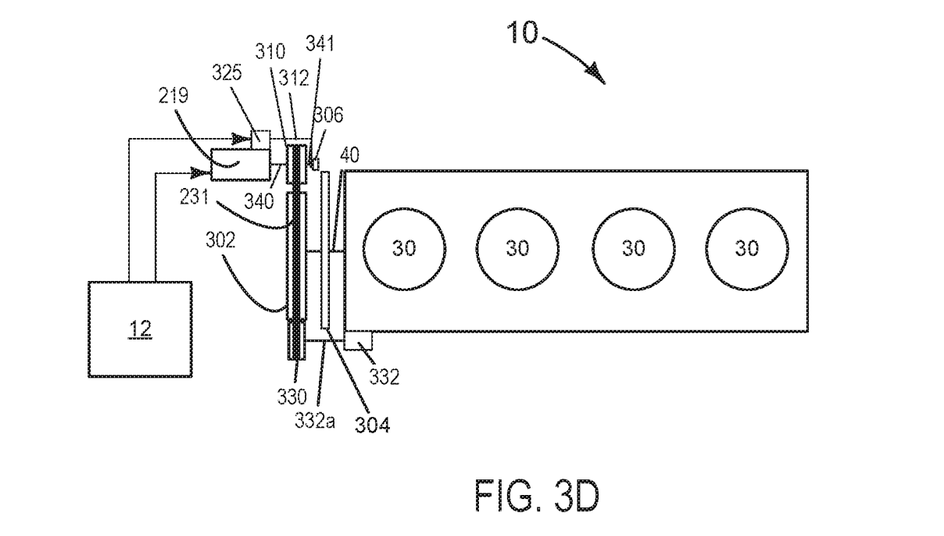

Referring now to FIG. 3D, a sketch of a second example engine and BISG configuration is shown. In this example, engine 10 is shown with four cylinders 30 that provide torque to rotate crankshaft 40. A flywheel 304 and a crankshaft pulley 302 are directly coupled to crankshaft 40 and they rotate when crankshaft 40 rotates. Flywheel 304 is positioned between crankshaft pulley 302 and engine 10 along crankshaft 40. BISG 219 and accessories (e.g., power steering pump, air conditioning compressor, heat pump, air pump, etc.) 332 are coupled to crankshaft 40 via crankshaft pulley 302 and belt 231. Accessory pulley 330 is directly coupled to shaft 332a of accessory 332 and it transfers energy (e.g., torque) from belt 231 to accessories 332. BISG shaft 340 is directly coupled to BISG pulley 310. Pinion gear 306 is directly coupled to spline shaft 341 as shown in greater detail in FIG. 3E. Solenoid 325 may be selectively actuated to cause pinion gear 306 to engage flywheel 304 via actuating arm 312. Controller 12 or an alternative controller commands solenoid 325 and BISG 219.

Figure 3E:
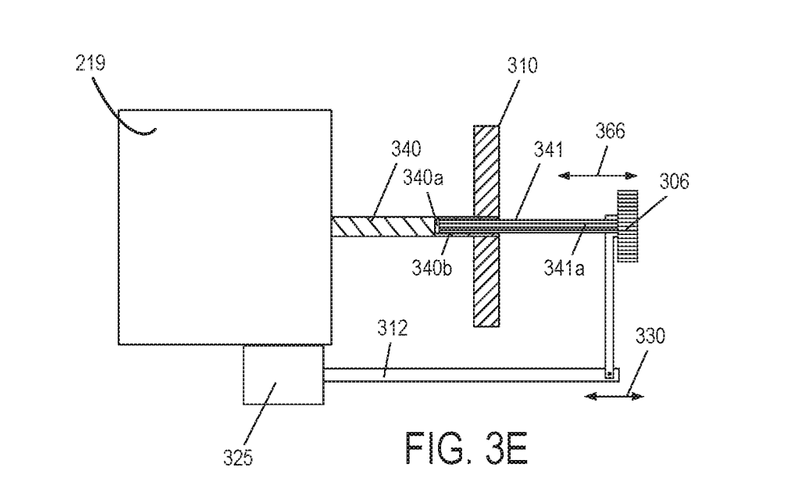

Referring now to FIG. 3E, a detailed view of the BISG configuration of FIG. 3D is shown. In this example configuration, BISG 219 includes a shaft 340 to which BISG pulley 310 is fastened so that BISG pulley 310 rotates with shaft 340. Shaft 340 and BISG pulley 310 are shown in a cross-section. Spline shaft 341 is shown inserted into cavity 340a of shaft 340. Cavity 340a includes internal splines 340b that are configured to receive splines 341a of shaft 341 so that axial movement between splined shaft 341 and shaft 340 is prevented. Pinion gear 306 is coupled to splined shaft 341 and pinion gear 306 may move along splined shaft 341 in a longitudinal direction as indicated by arrow 366. Solenoid 325 may extend actuating arm 312 longitudinally in the direction of arrow 330 when activated to engage pinion gear 306 to flywheel 304 (shown in FIG. 3D). Solenoid 325 may retract actuating arm 312 when deactivated (e.g., spring return or electrical return (not shown)) to disengage pinion gear 306 from flywheel 304 (shown in FIG. 3D). BISG 219 may transfer torque to and rotate engine 10 via flywheel 304 when pinion gear 306 is engaging flywheel 304. Controller 12 or another controller may adjust a position of solenoid 12 and operating state of BISG 219.

Figure 3F:
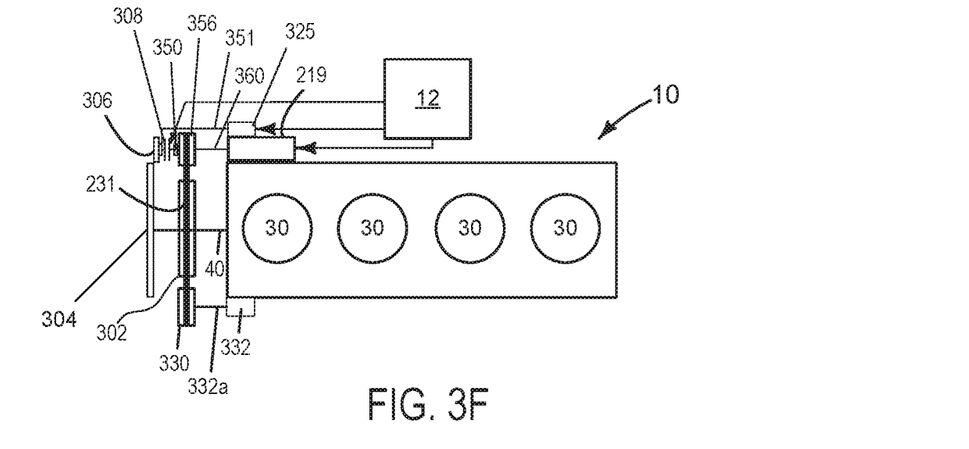

Referring now to FIG. 3F, a sketch of a third example engine and BISG configuration is shown. In this example, engine 10 is shown with four cylinders 30 that provide torque to rotate crankshaft 40. A flywheel 304 and a crankshaft pulley 302 are directly coupled to crankshaft 40 and they rotate when crankshaft 40 rotates. Crankshaft pulley 302 is positioned between flywheel 304 and engine 10 along crankshaft 40. BISG 219 and accessories (e.g., power steering pump, air conditioning compressor, heat pump, air pump, etc.) 332 are coupled to crankshaft 40 via crankshaft pulley 302 and belt 231. Accessory pulley 330 is directly coupled to shaft 332a of accessory 332 and it transfers energy (e.g., torque) from belt 231 to accessories 332. BISG shaft 360 is directly coupled to BISG pulley 356 and BISG clutch 308. Pinion gear 306 is directly coupled to BISG clutch 308 as shown in greater detail in FIG. 3G. Solenoid 325 may be selectively actuated to cause pinion gear 306 to engage flywheel 304 via actuating arm 351. Actuating arm 351 includes two levers to move pinion gear 306 and spline collar 350 simultaneously. Controller 12 or an alternative controller commands solenoid 325 and BISG 219.

Figure 3G:
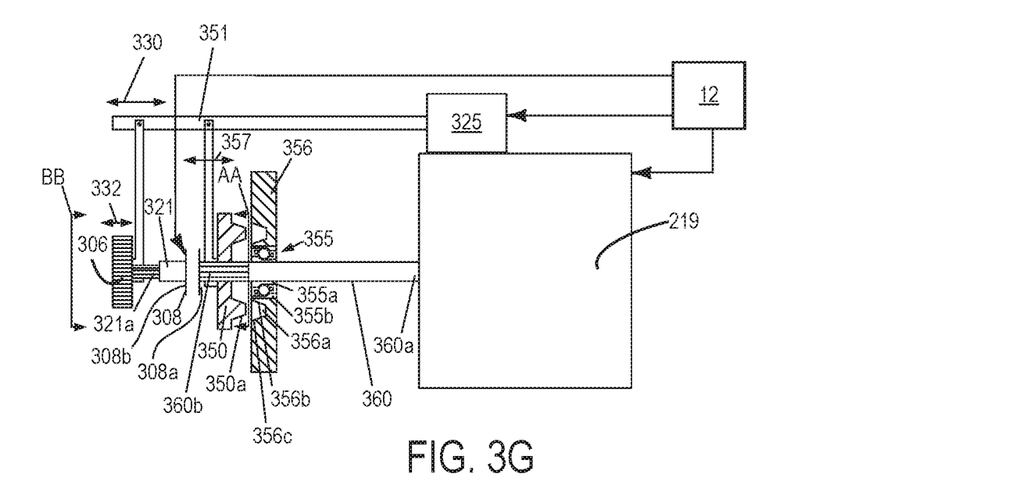

Referring now to FIG. 3G, a detailed view of the BISG configuration of FIG. 3F is shown. In this example configuration, BISG 219 includes a shaft 360 to which BISG pulley 356 is fastened. BISG pulley 356 includes a bearing 355 with an inner race 355a and an outer race 355b. Inner race 355a rotates with shaft 360 and outer race 355b is permitted to rotate or remain stationary independent from rotation of shaft 360. Inner race 355a may be pressed fit to smooth section 360a of shaft 360. Shaft 360 also includes a section with external splines 360b for engaging splined collar 350. Splined collar 350 includes inner splines 350c (shown in FIG. 3H) that allow splined collar 350 to slide longitudinally along shaft 360 as indicated by arrow 357. Inner splines 350c prevent axial motion between splined collar 350 and shaft 360 so that splined collar 350 rotates with shaft 360. Annular protrusion 350a of splined collar 350 may engage annular crevasse 356a so that outer race 355b of BISG pulley 356 rotates with shaft 360 when solenoid 219 is retracted or not activated. Inner chamfer 356b and outer chamfer 356c contact annular protrusion 350a when splined collar 350 is engaged with BISG pulley 356. BISG pulley 356 may remain stationary or rotate at a different speed than shaft 360 when splined collar 350 is not engaged with BISG pulley. By not engaging the splined collar 350 to the BISG pulley 356, torque transfer from belt 231 to BISG or vise-versa may be zero so that belt 231 is not stretched or strained when the engine is started during cold conditions. This may help to reduce the possibility of belt degradation.

Figure 3H:
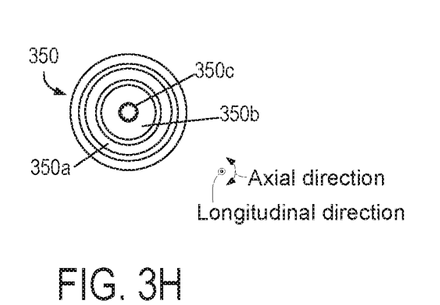

Shaft 360 is also directly coupled to a first side 308a of BISG clutch 308. A second side 308b of BISG clutch 308 is fastened to splined shaft 321 (e.g., a shaft including a series of narrow keys (splines 321a) formed longitudinally around a circumference of shaft 321 that fit into corresponding grooves of internal splines 371 (shown in FIG. 3I) in the pinion gear 306 that prevent axial movement between the pinion gear 306 and the shaft 321). Splined shaft 321 may be supported via brackets and bearings (not shown). Pinion gear 306 is shown coupled to splined shaft 321 and pinion gear 306 may move along splined shaft 321 in a longitudinal direction as indicated by arrow 332. Solenoid 325 may extend actuating arm 351 longitudinally in the direction of arrow 330 when activated to engage pinion gear 306 to flywheel 304 (shown in FIG. 3F) and disengage splined collar 350 from BISG pulley 356. Solenoid 325 may retract actuating arm 312 when deactivated (e.g., spring return or electrical return (not shown)) to disengage pinion gear 306 from flywheel 304 (shown in FIG. 3F) and engage splined collar 350 to BISG pulley 356. BISG clutch 308 may be electrically or hydraulically actuated. BISG 219 may transfer torque to and rotate engine 10 via flywheel 304 when BISG clutch 308 is fully closed and when pinion gear 306 is engaging flywheel 304. Opening BISG clutch 308 allows pinion gear 306 to cease rotating when pinion gear 306 is disengaged from flywheel 304 so that engine noise and vibration may be reduced. Controller 12 or another controller may adjust a position of solenoid 325 and the operating state of BISG 219. A view of splined collar is indicated as view AA. View AA is shown in FIG. 3H. A view of pinion gear 306 is indicated as view BB. View BB is shown in FIG. 3I.

Turning now to FIG. 3H, a view AA of splined collar 350 is shown. Annular protrusion 350a encircles cavity 350b, which allows splined collar 350 to engage BISG pulley 356 shown in FIG. 3G. Annular protrusion 350a allows splined collar 350 to engage BISG pulley 356 when splined collar is rotating. In an alternative example, tapered pins may be substituted for annular protrusion 350a, but slower engagement of splined collar 350 to BISG pulley 356 may be desired. Splined collar 350 also includes internal splines 350c for engaging splines 360b and preventing axial motion. Axial and longitudinal directions are indicated by the arrows. In this view, the longitudinal direction is into or out of the sheet.

Figure 3I:
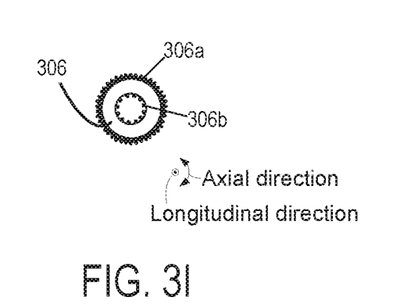

Turning now to FIG. 3I, a view BB of pinion gear 306 is shown. Pinion gear 306 includes a plurality of teeth 306a configured to engage teeth of flywheel 304. Pinion gear 306 also includes internal splines 306b configured to engage splines 321a to prevent axial motion between pinion gear 306 and shaft 321. Axial and longitudinal directions are indicated by the arrows. In this view, the longitudinal direction is into or out of the sheet.

The system of FIGS. 1-3I provides for a system, comprising: an engine including a flywheel; an integrated starter/generator (ISG) coupled to the engine via a belt; a pinion gear selectively coupled to the ISG via a clutch; and a controller including executable instructions stored in non-transitory memory to engage the pinion gear to the flywheel during a first engine start. The system further comprises additional instructions to start the engine via the belt while the pinion gear is disengaged from the flywheel during a second engine start. The system includes where engine temperature during the second engine start is greater than engine temperature during the first engine start. The system further comprises a pulley and a splined collar coupled to a shaft of the ISG and additional instructions to engage the pulley with the splined collar during the second engine start. The system further comprises additional instructions to disengage the splined collar from the pulley during the first engine start. The system further comprises additional instructions to engage the clutch during the first engine start.

FIGS. 3A-3I show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Referring now to FIG. 4, example plots of a vehicle operating sequence are shown. The operating sequence may be performed via the system of FIGS. 1-3I in cooperation with the method of FIG. 5. Vertical lines at times t0-t4 represent times of interest during the sequence. The plots in FIG. 4 are time aligned and occur at the same time.

The first plot from the top of FIG. 4 is a plot of engine cranking request versus time. The vertical axis represents engine cranking request and engine cranking request is a cranking request to start a cold engine (e.g., engine temperature is less than a threshold) when trace 402 is at a level near the vertical axis arrow that is indicated by the "Cold" label next to the vertical axis. A cranking request to start a warm engine is asserted when trace 402 is at a middle level of the vertical axis that is indicated by the "Warm" label. No cranking request to start the engine is asserted when trace 402 is at a lower level of the vertical axis that is indicated by the "No crank" label. The engine may be combusting fuel or stopped (not rotating) and not combusting fuel when trace 402 is at the lower level. Solid line 402 represents engine cranking state. The horizontal axis represents time and time increases from the left side of the figure to the right side of the figure.

The second plot from the top of FIG. 4 is a plot of pinion gear state versus time. The pinion gear is engaged with the flywheel when trace 404 is at a higher level near the vertical axis arrow. The pinion gear is not engaged with the flywheel when trace 404 is at a lower level near the horizontal axis. The horizontal axis represents time and time increases from the left side of the figure to the right side of the figure.

The third plot from the top of FIG. 4 is a plot of BISG clutch operating state versus time. Trace 406 represents the BISG clutch operating state and the BISG clutch is fully closed to transfer torque across the BISG clutch when line 406 is at a higher level near the vertical axis arrow. The BISG clutch is fully open and it does not transfer torque when line 406 is at a lower level near the horizontal axis. The horizontal axis represents time and time increases from the left side of the figure to the right side of the figure.

The fourth plot from the top of FIG. 4 is a plot of BISG operating mode versus time. Trace 408 represents the BISG operating mode and the BISG is off (not generating or consuming energy) when trace 408 is at a lower level near the horizontal axis. The BISG is operating as a motor when trace 408 is at a middle level as indicated along the vertical axis. The BISG is operating as a generator when trace 408 is at a higher level as indicated along the vertical axis. The horizontal axis represents time and time increases from the left side of the figure to the right side of the figure.

The fifth plot from the top of FIG. 4 is a plot of spline collar state versus time. Trace 410 represents the spline collar state and the spline collar is engaged with the BISG pulley to allow the BISG pulley to rotate with the BISG shaft. The spline collar is disengaged from the BISG pulley allowing the BISG pulley to remain stationary or rotate independent from the BISG shaft when trace 410 is at a lower level near the horizontal axis. The horizontal axis represents time and time increases from the left side of the figure to the right side of the figure.

At time t0, the engine is stopped (e.g., not rotating) and BISG pinion is not engaged. The BISG control clutch is fully open so that the pinion gear does not rotate with the BISG shaft. The BISG is off and the spline collar is engaged to the BISG pulley. Such operating states may be present when the vehicle is not being operated.

At time t1, an engine cold cranking request is made and the pinion gear is engaged to the engine flywheel via a solenoid being activated. The BISG clutch is also closed to allow the BISG to apply torque to the engine. The BISG is activated in motor mode and the spline collar is disengaged from the BISG pulley. Between time t1 and time t2, the engine is rotated by the BISG via the flywheel and the pinion gear. The BISG belt is rotated by the engine and BISG belt tension is low.

At time t2, the engine is started and the engine cranking request is withdrawn. The pinion gear is disengaged from the engine flywheel and the BISG clutch is fully opened to cease pinion gear rotation. The BISG changes modes to operate as a generator to charge a vehicle battery and the spline collar is engaged to the BISG pulley so that the engine may rotate the BISG to generate electric charge. Between time t2 and time t3, the BISG operates as a generator and then is shut off. The engine is also shut off (stops rotating and fuel is not supplied to the engine (not shown)) before time t3.

At time t3, an engine warm cranking request is made and the pinion gear remains disengaged from the engine flywheel via a solenoid being deactivated. The BISG clutch remains fully open and the spline collar remains engaged to the BISG pulley so that the BISG may rotate the engine via the BISG pulley. Between time t3 and time t4, the engine is rotated by the BISG via the BISG pulley, the BISG belt, and the crankshaft pulley.

In this way, a BISG may rotate the engine during a cold start via a pinion gear to reduce BISG belt wear. However, during a warm start when engine friction is lower, the BISG may rotate the engine via a BISG pulley and BISG belt to reduce engine noise and vibration.

Referring now to FIG. 5, a flow chart of a method for operating a hybrid vehicle driveline is shown. The method of FIG. 5 may be incorporated into and may cooperate with the system of FIGS. 1-3I. Further, at least portions of the method of FIG. 5 may be incorporated as executable instructions stored in non-transitory memory while other portions of the method may be performed via a controller transforming operating states of devices and actuators in the physical world.

At 502, method 500 determines operation conditions. Operating conditions may include but are not limited to engine speed, engine temperature, BISG torque, ISG torque, driver demand torque, engine load, ambient temperature, ambient pressure, vehicle speed, and BISG speed. Method 500 proceeds to 504.

At 504, method 500 judges if an engine cold start is requested. An engine cold start may be requested via a human driver supplying input to a human/machine interface or an automated driver while the engine temperature is less than a threshold temperature. If method 500 judges that engine cold starting is requested, the answer is yes and method 500 proceeds to 520. Otherwise, the answer is no and method 500 proceeds to 506.

At 506, method 500 judges if an engine warm start is requested. An engine warm start may be requested via a human driver supplying input to a human/machine interface or an automated driver while the engine temperature is greater than the threshold temperature. If method 500 judges that engine warm starting is requested, the answer is yes and method 500 proceeds to 508. Otherwise, the answer is no and method 500 proceeds to 540.

At 540, method 500 judges if the engine is running (e.g., rotating and combusting fuel). Method 500 may judge that the engine is running if the engine is rotating under its own power and being supplied fuel. If method 500 judges that the engine is running, the answer is yes and method 500 proceeds to 516. Otherwise, the answer is no and method 500 proceeds to 542.

At 542, method 500 operates the DISG and the BISG according to driver demand torque and vehicle speed. The DISG may propel the vehicle when the engine is not running. Method 500 proceeds to exit.

At 516, method 500 operates the engine, DISG, and BISG according to driver demand torque and vehicle speed. The engine, BISG, and DISG may provide torque to propel the vehicle responsive to the driver demand torque and vehicle speed. For example, if driver demand torque increases, the engine torque may be increased to meet the driver demand torque. Further, the DISG torque may be increased to meet driver demand torque. If driver demand torque is low and battery state of charge (SOC) is low, the engine may provide torque to the DISG and BISG to charge electric energy storage devices. The engine torque may be increased or decreased responsive to the driver demand torque via an engine torque actuator. Operating modes of the DISG and BISG may also be changed responsive to the driver demand torque and vehicle speed. If the engine does not start after an engine start request, engine starting may be reattempted. Method 500 proceeds to exit.

At 508, method 500 disengages the pinion gear from the engine flywheel. In addition, if a BISG clutch is present in the system, the BISG clutch is fully opened. By disengaging the pinion gear from the flywheel, wear of the pinion gear may be reduced. Further, by disengaging the clutch, noise and vibration of the system may be reduced. Method 500 proceeds to 510.

At 510, method 500 engages the splined collar to the BISG pulley, if the system includes a splined collar, so that the BISG pulley rotates with the BISG shaft. By engaging the splined collar to the BISG pulley, the BISG may rotate the engine when the engine is warm, increase driveline torque, and generate torque from engine torque depending on the mode that the BISG is in. Thus, engaging the splined collar to the BISG allows torque to transfer between the BISG and the engine via the BISG belt. Method 500 proceeds to 512.

At 512, method 500 rotates the engine via the BISG and the BISG belt to start the engine. Thus, the BISG is operated in a motor mode to rotate the engine. In addition, spark and fuel are supplied to the engine so that the engine may start. Method 500 proceeds to 514.

At 514, method 500 judges if the engine is started or if the engine cranking time exceeds a threshold amount of time (e.g., 2.5 seconds). In one example, method 500 may judge that the engine is started if engine speed is greater than a threshold speed (e.g., the commanded BISG speed multiplied by the pulley ratio between the BISG and the engine). If method 500 judges that the engine is started or engine cranking time is greater than a threshold, the answer is yes and method 500 proceeds to 516. Otherwise, the answer is no and method 500 returns to 512.

At 520, method 500 engages the pinion gear from the engine flywheel via a solenoid. By engaging the pinion gear to the flywheel, the engine may be cranked (rotated under power of the BISG) with a reduced load on the BISG belt so that BISG degradation may be reduced. Method 500 proceeds to 522.

At 522, method 500 fully closes the BISG clutch if a BISG clutch is present in the system. Closing the BISG clutch allows the BISG to transfer torque to the engine flywheel. Method 500 proceeds to 524.

At 524, method 500 disengages the splined collar from the BISG pulley, if the system includes a splined collar, so that the BISG pulley may rotate independently from the BISG shaft. By disengaging the splined collar from the BISG pulley, torque produced by the BISG may not be transferred to the engine via the BISG belt. Thus, disengaging the splined collar from the BISG pulley does not allow torque to transfer from the BISG to the engine via the BISG belt. Method 500 proceeds to 526.

At 526, method 500 rotates the engine via the BISG, pinion gear, and the engine flywheel to start the engine. Thus, the BISG is operated in a motor mode to rotate the engine. In addition, spark and fuel are supplied to the engine so that the engine may start. Method 500 proceeds to 528.

At 528, method 500 judges if the engine is started or if the engine cranking time exceeds a threshold amount of time (e.g., 2.5 seconds). In one example, method 500 may judge that the engine is started if engine speed is greater than a threshold speed (e.g., the commanded BISG speed multiplied by the pulley ratio between the BISG and the engine). If method 500 judges that the engine is started or engine cranking time is greater than a threshold, the answer is yes and method 500 proceeds to 530. Otherwise, the answer is no and method 500 returns to 526.

At 530, method 500 disengages the pinion gear from the engine flywheel. In addition, if a BISG clutch is present in the system, the BISG clutch is fully opened. By disengaging the pinion gear from the flywheel, wear of the pinion gear may be reduced. Further, by disengaging the clutch, noise and vibration of the system may be reduced. Method 500 proceeds to 532.

At 532, method 500 engages the splined collar to the BISG pulley, if the system includes a splined collar, so that the BISG pulley rotates with the BISG shaft. By engaging the splined collar to the BISG pulley, the BISG may rotate the engine when the engine is warm, increase driveline torque, and generate torque from engine torque depending on the mode that the BISG is in. Thus, engaging the splined collar to the BISG allows torque to transfer between the BISG and the engine via the BISG belt. Method 500 proceeds to 516.

In this way, the path (e.g., BISG belt or flywheel) which torque is delivered between the BISG and the engine may be changed responsive to operating conditions. Accordingly, the method may reduce engine noise and vibration while reducing the possibility of BISG belt degradation.

The method of FIG. 5 provides for a powertrain operating method, comprising: cranking an engine via an integrated starter/generator, a pinion gear, and a flywheel during a first engine start; and cranking the engine via the integrated starter/generator, a belt, and a crankshaft pulley during a second engine start. The method includes where the pinion gear engages the flywheel during the first engine start, and where the pinion gear is in mechanical communication with the integrated starter/generator. The method includes where the pinion gear is not engaged to the flywheel during the second engine start. The method includes where cranking the engine includes rotating the engine under power supplied via the integrated starter/generator. The method further comprises closing a BISG control clutch during cranking of the engine via the pinion gear. The method further comprises charging an electric energy storage device via the integrated starter/generator while the engine is combusting fuel. The method includes where the flywheel is coupled to the engine. The method further comprises rotating the flywheel via the pinion gear during the first engine start and ceasing to rotate the pinion gear after the first engine start while the engine is rotating and combusting fuel.

The method of FIG. 5 also provides for a powertrain operating method, comprising: disengaging a spline collar from a belt pulley during a first engine start, the belt pulley mechanically coupled to a shaft of an integrated starter/generator, the belt pulley coupled to an engine crankshaft pulley; engaging the spline collar to the belt pulley during a second engine start; and cranking an engine the via the belt pulley and the integrated starter/generator during the second engine start. The method includes where the engine is cranked via the integrated starter/generator during the first engine start. The method further comprises opening a BISG control clutch during the second engine start. The method further comprises closing the BISG control clutch during the first engine start. The method further comprises cranking the engine via a pinion gear and a flywheel during first engine start. The method includes where the spline collar is engaged and disengaged via a solenoid.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A powertrain operating method, comprising:
disengaging a spline collar from a belt pulley during a first engine start, the belt pulley mechanically coupled to a shaft of an integrated starter/generator, the belt pulley coupled to an engine crankshaft pulley;
engaging the spline collar to the belt pulley during a second engine start; and
cranking an engine via the belt pulley and the integrated starter/generator during the second engine start.

2. The method of claim 1, where the engine is cranked via the integrated starter/generator during the first engine start.

3. The method of claim 1, further comprising opening a BISG control clutch during the second engine start.

4. The method of claim 1, further comprising closing the BISG control clutch during the first engine start.

5. The method of claim 4, further comprising cranking the engine via a pinion gear and a flywheel during first engine start.

6. The method of claim 1, where the spline collar is engaged and disengaged via a solenoid.

* * * * *